United States Patent

Saurer et al.

[11] Patent Number: 5,959,432
[45] Date of Patent: Sep. 28, 1999

[54] DEVICE FOR CHARGING A BATTERY USING A PHOTOVOLTAIC CELL, AND TIMEPIECE COMPRISING SAME

[75] Inventors: Eric Saurer, Bevaix; Pierre-André Farine, Neuchâtel, both of Switzerland

[73] Assignee: Asulab S.A., Bienne, Switzerland

[21] Appl. No.: 09/117,542

[22] PCT Filed: Feb. 17, 1997

[86] PCT No.: PCT/CH97/00052

§ 371 Date: Aug. 6, 1998

§ 102(e) Date: Aug. 6, 1998

[87] PCT Pub. No.: WO97/30503

PCT Pub. Date: Aug. 21, 1997

[30] Foreign Application Priority Data

Feb. 16, 1996 [CH] Switzerland ............................. 00417/96
Mar. 20, 1996 [FR] France ................................... 96 03451

[51] Int. Cl.[6] .................................................. H01M 10/46
[52] U.S. Cl. .................................................. 320/101
[58] Field of Search ................................ 320/101, 103, 320/110, 132, 135; 136/243, 291, 293

[56] References Cited

U.S. PATENT DOCUMENTS 3,448,575  6/1969  Grohoski .
4,240,021  12/1980  Kashima et al. .

FOREIGN PATENT DOCUMENTS 29 00 622   7/1980  Germany .
2 149 942   6/1985  United Kingdom .
WO 93/19405 9/1993  WIPO .

OTHER PUBLICATIONS

Elektronik, vol. 39, No. 9, Apr. 27, 1990, pp. 150/151 XP000116206 Rittenbruch F–A: "Solar–Akkulader mit Nur einer Solarzelle".
Patent Abstracts of Japan vol. 009, No. 207 (P–382), Aug. 24, 1985 & JP 60 069589 A (Suwa Seikosha KK), Apr. 20, 1985.

Primary Examiner—Edward H. Tso
Attorney, Agent, or Firm—Griffin, Butler, Whisenhunt & Szipl, LLP

[57] ABSTRACT

A device for charging a battery (11), comprising a photovoltaic cell power source (8) of which the output voltage (USC) is lower than the voltage (VDD) across the terminals of the battery. Said output voltage is raised by a voltage multiplier (26) controlled by a static unit (27) depending on the two respective voltage levels. The source may advantageously comprise a single cell (8). In a timepiece provided with said charging device, the static control unit (27) can also cut off the power supply to display means (13, 23) and time-keeping circuits (21, 22) when the voltage of the battery (11) is too low. The voltage multiplier may use the motor coil (13) of the display means or any other coil used in the timepiece.

24 Claims, 2 Drawing Sheets

DEVICE FOR CHARGING A BATTERY USING A PHOTOVOLTAIC CELL, AND TIMEPIECE COMPRISING SAME

The present invention concerns a device for charging an electric accumulator including a photovoltaic cell power source, coupled to the accumulator and a voltage multiplier connected in series between the power source and the accumulator.

The invention also concerns an electronic timepiece, in particular a watch or an alarm clock, including such a charging device.

However, the applications of a charging device according to the invention are not limited to the horological field, but can concern any electronic apparatus including an electric accumulator and a photovoltaic cell power source intended for charging the accumulator, for example a pocket or table electronic calculator, a radio transmitter or receiver, an infrared signal remote control apparatus, a sensor, and generally any apparatus having an autonomous electric supply and storing electric power generated by solar cells.

Currently, one tends to operate low consumption electronic apparatus at as low a supply voltage as possible, of the order of 1.0 to 1.5 volts, which represents a current lower limit for the proper operation of certain electronic components. However, the photovoltaic cells currently preferred for supplying these devices, whether of the photochemical or semi-conductor type, generally only provide a lower voltage, typically of the order of 0.3 to 0.5 volts, so that it is necessary to connect at least three of these cells in series (see for example British Patent Document GB-A-2 149 942). These cells are generally juxtaposed on a visible face of the in order to benefit from the same lighting conditions. Such an arrangement can have drawbacks. On the one hand, in miniaturised apparatus, the manufacture of a small unit of several cells is more expensive than that of a single larger cell. On the other hand, in objects where aesthetic appearance is important, as in the horological field, the lines of separation between the juxtaposed cells are often inconvenient and would disappear if a single cell could be used, or two superposed quasi transparent cells as described in the Patent Document WO 93/19405.

In application to a wristwatch, a power source formed of several juxtaposed photovoltaic cells connected in series has the additional drawback of being liable to a shadow effect by clothes: if for example a sleeve puts one of the cells in shadow, the voltage provided by the latter drops significantly and thus the total output voltage of the cells can drop to a value insufficient for charging the accumulator.

German Patent Application DE-A-29 00 622 describes a device capable of charging an accumulator by means of a solar cell whose output voltage is lower than the voltage across the accumulator terminals, as a result of a voltage converter including an inductor and a diode connected in series between the electric power source and the accumulator. The junction between the inductor and the diode is cyclically connected to earth by a transistor controlled by a monostable device. The latter receives an input signal originating from a photoresistive sensor which measures the illumination to which the solar cell is exposed. When the illumination increases, the time constant of the monostable device increases, which decreases the charge resistance of the solar cell in order to optimise it.

However, the described device is liable to consume more energy than it generates when the illumination of the cell is relatively low, which can eventually lead to the accumulator being discharged. Furthermore, it is difficult to optimise the operation thereof because the illumination response features of the solar cell and the photoresistor are generally different. On the other hand, the presence of the photoresistor as an additional external element is disadvantageous in several respects, in particular in a watch, because of the space which must be reserved for it, the manufacturing cost, and the risk of it being subject to different illumination to the solar cell.

An object of the present invention is to avoid the aforementioned drawbacks, by providing an efficient, simple, inexpensive charging device which can advantageously be applied to a timepiece, in particular to a watch.

A particular object consists in arranging the charging device so that it consumes an extremely small amount of energy when the accumulator has a low state of charge and the photovoltaic cell is only slightly illuminated or not illuminated at all.

Another particular object consists, in the application of the device to an electronic timepiece, in combining the device with the energy consuming circuits of the watch so as to avoid the accumulator discharging excessively.

According to a first aspect of the invention, a charging device of the type indicated in the preamble is provided, characterised in that it includes control means arranged to switch on and off the voltage multiplier as a function of the output voltage of the electric power source and as a function of a state of charge of the accumulator.

Thus, the operation of the charging device can be limited to favourable periods, when the photovoltaic power source is sufficient to allow the accumulator to be really charged, and only when it is necessary, in particular to avoid overcharging which would decrease the lifespan of the accumulator.

It is possible to use as the electric power source a single photovoltaic cell providing a voltage which is only a fraction of the normal voltage across the accumulator terminals. If necessary, an electric power source including at least two photovoltaic cells connected in series, but together providing a voltage which can be lower than the voltage across the accumulator terminals can also be used.

A second aspect of the invention concerns an electronic timepiece including an electric accumulator, horometric means and display means which are supplied by the accumulator, characterised in that it includes a photovoltaic cell and voltage multiplier charging device as defined hereinbefore.

The combination of a charging device according to the invention with an electronic timepiece is particularly advantageous because it allows a single photovoltaic cell to be used, even if said cell is of a type having a relatively low output voltage. This allow the drawbacks outlined above with respect to aesthetic appearance and manufacturing cost to be avoided. This also facilitates the use of a practically transparent and invisible cell, preferably covering the entire expanse of the display means, on the side on which they are visible, and leaving the designer total freedom in the choice of the external appearance of the dial and the timepiece in general.

A third aspect of the invention concerns an electronic timepiece including an electric accumulator, horometric means and display means, the horometric means and the display means being supplied by the accumulator, and a charging device provided with a photovoltaic cell power source, coupled to the accumulator, characterised in that the charging device includes a voltage multiplier connected in series between the electric power source and the accumulator and including an inductor which is formed by a coil forming part of the display means or another device of the timepiece. In particular if the display means include a motor, said coil can form part of said motor.

This combination is especially advantageous because it avoids an additional inductance coil for the voltage multiplier. Said coil is the only relatively cumbersome and heavy component of the latter, whereas the other components can be made in an integrated circuit. The omission of a coil also simplifies assembly of the timepiece.

In the second and third aspect of the invention, the aforementioned control means for the charging device can be combined with the conventional electronic means of the timepiece with a view to saving energy when the state of charge of the accumulator is low, in particular by blocking the supply of the display means and/or the horometric means as a function of one or more limit states of discharge of the accumulator, parallel to the stopping of the voltage multiplier.

Other features and advantages of the present invention will appear in the following description of a preferred embodiment, given solely by way of example and with reference to the annexed drawings, in which.

Figure 1:
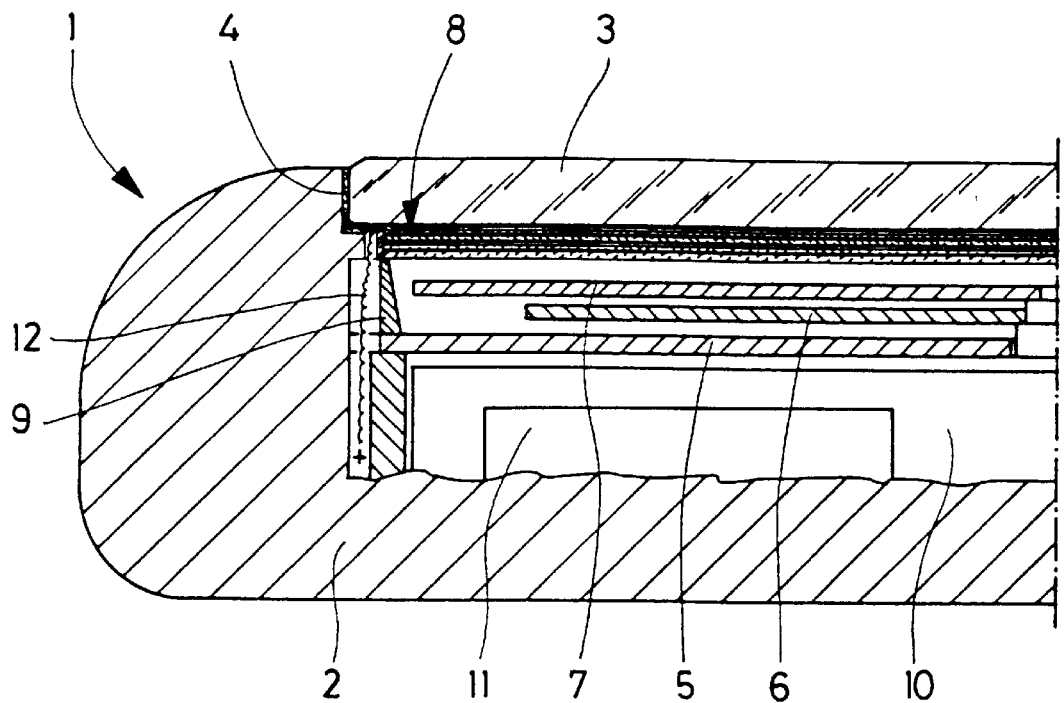
FIG. 1 is a schematic partial cross-section of watch fitted with an electric accumulator and a voltage multiplier charging device according to the invention.

Watch 1 shown schematically in FIG. 1 includes a case 2 onto which is fixed a crystal 3, for example via a sealing gasket 4. In a conventional manner, a user can see, through crystal 3, display means including a dial 5 and hands 6 and 7 moving over the dial. A photovoltaic cell 8 is arranged for example between the hands and crystal 3, against which it is held applied by a ring 9 resting on dial 5. In this example, it is a transparent photovoltaic cell the nature and arrangement of which are described in Patent Document No. WO 93/19405. This cell completely covers the display means, and, as a result of its transparency, it has no effect upon the reading of the time and the appearance of the dial. When it receives light, its output voltage varies approximately between 0.3 and 0.5 volts according to the lighting conditions. It will be noted that cell 8 could also be placed on dial 5 or form the dial itself. In such case, an opaque cell, in particular made of silicon could be used.

Underneath dial 5, case 2 contains in particular an electronic clockwork movement 10 and an electric accumulator 11. In this example, it is a chemical accumulator, preferably of the lithium ions type, whose service voltage is comprised between 1.0 and 1.5 volts. It will be noted however, that the present invention can also be used with other types of electric accumulators and electrochemical capacitors, in particular super-capacitors. The electrodes of photovoltaic cell 8 are connected to the electric circuits situated underneath dial 5 by two conductors 12 only one of which is shown in FIG. 1.

Figure 2:
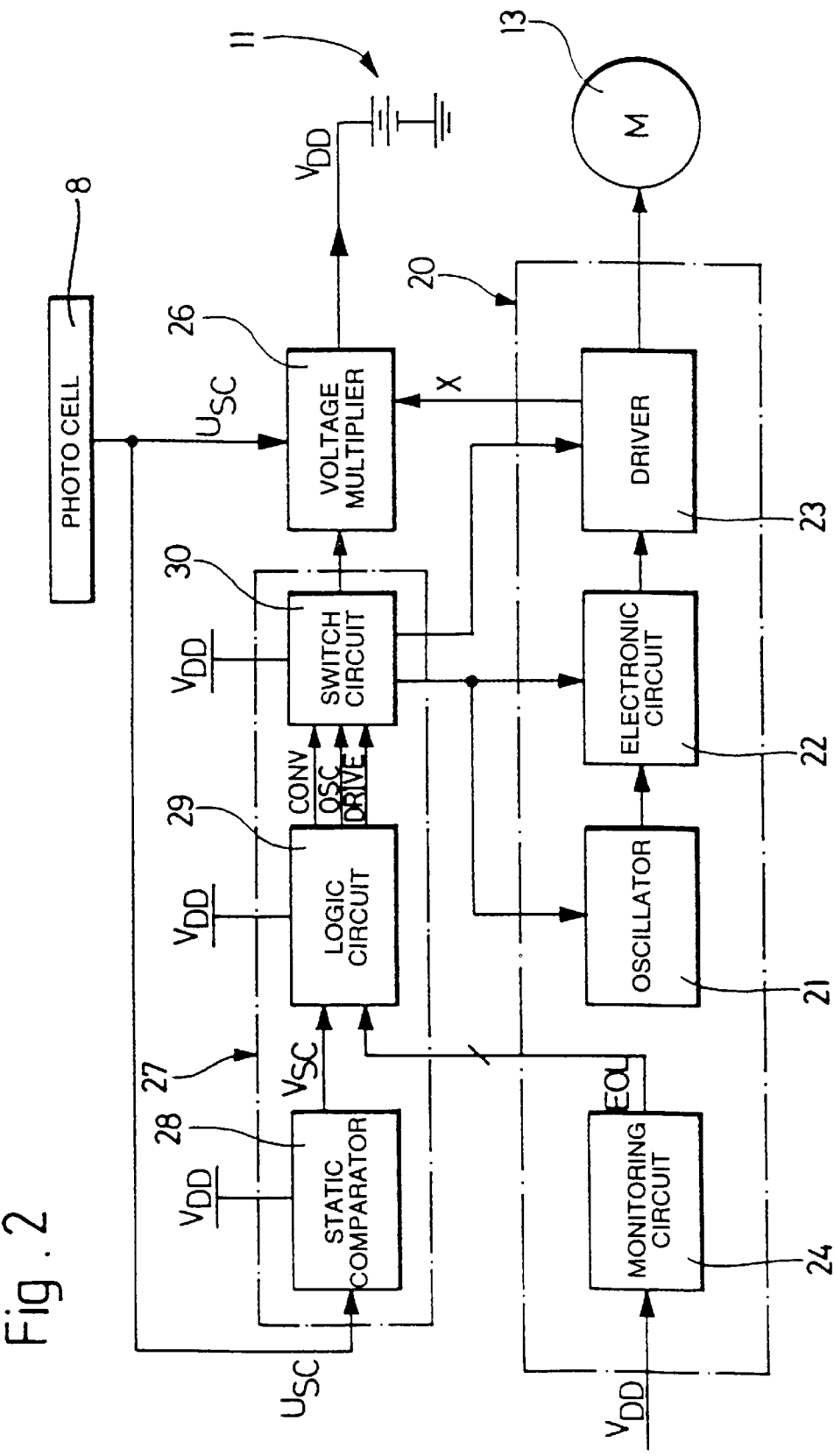
FIG. 2 is a block diagram of the electric circuits of the watch.

With reference to FIG. 2, the display means of watch 1 include a stepping motor 13 which drives hands 6 and 7 using the energy provided by accumulator 11. Motor 13 is controlled by a conventional horometric integrated circuit 20 including an oscillator 21, for example controlled by a quartz resonator, and an electronic unit 22 including a divider circuit and memories, associated with a driving circuit 23 for the motor. The output signal of oscillator 21 is processed by unit 22 which controls driving circuit 23 in a suitable manner to display the time on dial 5 by means of hands 6 and 7. In order to monitor the voltage $V_{DD}$ across the terminals of accumulator 11, integrated circuit 20 further includes a monitoring circuit 24 which compares this voltage to one or more limit voltages and consequently supplies a digital signal EOL which is able to take different values indicating that the accumulator voltage level is above or below these different limits. Circuits of this type, sometimes called end of life circuits and intended for indicating whether a battery has reached the end of its life, are well known in the horological field.

The charging device for accumulator 11 includes, in addition to photovoltaic cell 8, a DC—DC converter formed by a voltage multiplier 26 and controlled by a complementary static unit 27. Voltage multiplier 26 receives the output DC current from photovoltaic cell 8, at variable voltage $U_{SC}$. When it is switched on, it multiplies said voltage, for example by a factor comprised between 2 and 4 according to the arrangement thereof, to supply an output voltage higher than existing voltage $V_{DD}$ of accumulator 11.

The complementary static unit includes a static comparator 28, a logic unit 29 and a switching unit 30, these three elements being supplied by voltage $V_{DD}$ of the accumulator. In this example, static comparator 28 preferably includes an inverter or follower circuit CMOS LV having a switching voltage set at 0.4 volts. This value is selected according to the voltage features of cell 8. It is fixed by the geometrical dimensions of the pair of p channel and n channel transistors of the inverter. Comparator 28 receives output voltage $U_{SC}$ as input signal and, according to whether this voltage is less than or greater to the switching voltage, provides to logic unit 29 a binary output signal $V_{SD}$ having the value 1 when $U_{SC}$<0.4 volts, and the value 0 when $U_{SC}$>0.4 volts. It will be noted that static comparator 28 can be replaced by other comparison circuits having an equivalent effect. It has however the advantage of avoiding the use of a reference source of voltage.

Logic unit 29 receives signals $V_{SC}$ and EOL and, as a function of the state thereof, supplies binary output signals CONV, OSC and DRIVE to switching unit 30, in accordance with rules of logic which will be described hereinafter. These signals control electronic switches in unit 30 in order to supply voltage $V_{DD}$ respectively to voltage multiplier 26, the assembly of oscillator 21 and unit 22, and to driving circuit 23 of motor 13.

In an embodiment of the device shown in FIG. 2, monitoring unit 24 compares voltage $V_{DD}$ of accumulator 11 to a single limit value, for example 1.0 volts, i.e. its output signal EOL is a binary signal. The two binary signals $V_{SC}$ and EOL present at the input of logic unit 29 can thus have four possible combinations, corresponding to the four situations A to D shown in Table I, which shows the values that this circuit attributes to signals CONV, OSC and DRIVE in each situation. The value 1 represents the switching on of the corresponding element, and the value 0 the switching off thereof.

TABLE I

| Case | USC ≧ 0.4 s | VDD ≧ 1.0 v | CONV | OSC | DRIVE |
|------|-------------|-------------|------|-----|-------|
| A | No | No | 0 | 0* | 0 |
| B | Yes | No | 1 | 0* | 0 |
| C | No | Yes | 0 | 1 | 1 |
| D | Yes | Yes | 1 | 1 | 1 |

It will be noted that voltage converter or multiplier 26 is only switched on when cell 8 supplies a voltage greater than or equal to 0.4 volts. With the type of accumulator used here, there is no risk of overcharging since the voltage across the terminals of the completely charged accumulator rises to close to 2 volts, a value which cannot be reached by the voltage of the cell after multiplication.

Below a limit value of 1.0 volts across the terminals of accumulator 11, horometric circuits 21 and 22 and display means 23 and 13 are switched off in order to save energy. This limit is selected so as to keep between 10 and 20% of the accumulator charge, in order to be able still to operate the charging device when cell 8 again receives light after a long period of darkness, which can be up to one year, according to the value of the self-discharging current of the accumulator.

The signs * in the OSC column indicate the possibility of a variant in which monitoring circuit 24 monitors two distinct limit voltages on the curve of discharge of accumulator 11, for example a first limit at 1.1 volts and a second limit at 1.0 volts. Signal EOL then has several bits. In this case, in a first stage of discharge where the voltage is between 1.1 and 1.0 volts, logic unit 29 gives signal DRIVE the value 0 in order to switch off elements 23 and 13 which consume the most current, i.e. the display is stopped. Conversely, horometric circuits 21 to 22 continue to operate so that the watch keeps time when the accumulator is charged. It is only if voltage VDD drops below 1.0 volts that signal OSC passes to 0 to stop the horometric circuits. The residual charge of the accumulator is nonetheless sufficient to supply the charging device when photovoltaic cell 8 is again subjected to light.

It will be noted that monitoring circuit 24 can also indicate via signal EOL that the level of charge of accumulator 11 is very high. Logic unit 29 can then switch off voltage multiplier 26 via signal CONV in order to control the accumulator.

Figure 3:
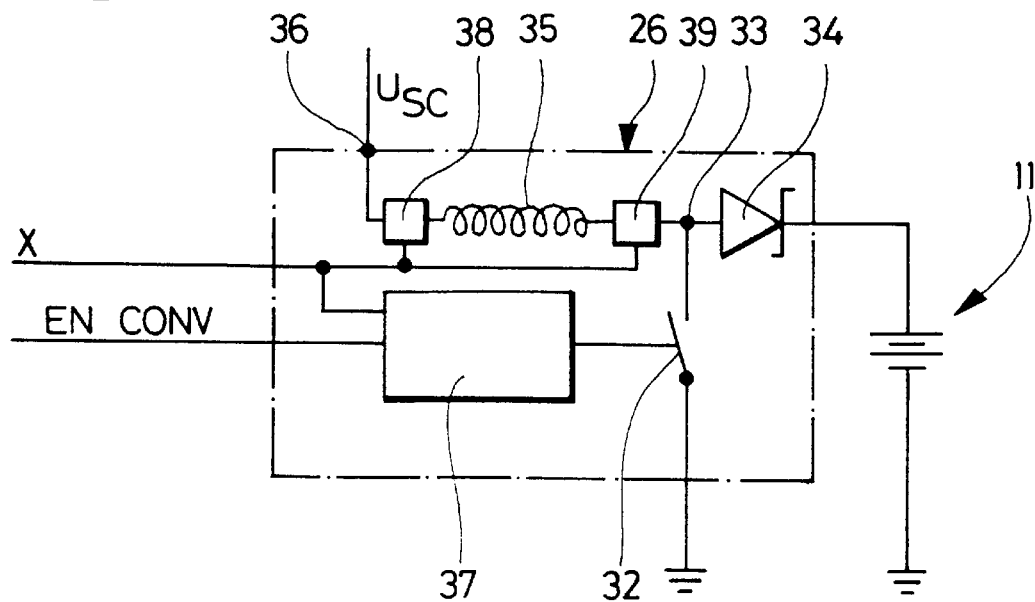
FIG. 3 shows schematically an advantageous embodiment of the voltage multiplier.

FIG. 3 shows a known embodiment of DC voltage multiplier 26, including an electronic switch 32 connected in parallel to accumulator 11 between a node 33 and earth, a Schottky diode 34 being connected in series between node 33 and the accumulator, while an inductor 35 is connected in series between node 33 and input terminal 36 which receives voltage USC from photovoltaic cell 8. Switch 32 is periodically opened and closed by a control circuit 37 activated by a validation signal EN CNV originating from switching unit 30. At each opening of switch 32, the high voltage induced current due to inductor 35 charges accumulator 11. Switch 32 and its control circuit 37 can be made for example by means of a MAX 631 type circuit by the Maxim company.

One advantageous aspect of this voltage multiplier consists in using the stator inductive coil of stepping motor 13, normally intended for driving the watch display means, as inductor 35. Since this motor only operates for short moments for the display, it is possible to connect its coil to voltage multiplier 26 outside such moments, i.e. most of the time. One thus avoids adding a coil, which is a relatively heavy and voluminous element, to the watch, to make the device according to the invention. The coil will then be preceded and followed by electronic switching devices 38 and 39, arranged to connect it alternately to voltage multiplier 26 and to the circuit of motor 13 as a function of control signals X originating from driving circuit 23. It will be noted that device 39 is not necessary in all cases, as a result of the presence of diode 34.

The charging device could also use, instead of the stator coil of motor 13, any other existing coil in another device of the timepiece, in particular in an alarm device, a voltage transformer for supplying for example an electroluminescent element, or a coil connected in parallel to a piezoelectric motor.

The use of the motor coil or the coil of another device as inductor 35 of the voltage converter allows a light, compact and inexpensive construction, which is thus well suited to horological applications, because the other components of the converter can easily be included in an integrated circuit containing static unit 27, in particular integrated circuit 20 described hereinbefore.

It should be noted that the applications of the invention are not limited to the case of photovoltaic cells of the photochemical type, but also extend to any other type, in particular to monocrystalline or polycrystalline amorphous silicon cells.

We claim:

1. An electronic timepiece including an electric accumulator, horometric means and display means, said horometric means and said display means being supplied by said accumulator, and a charging device provided with a photovoltaic cell electric power source coupled to said accumulator, wherein said charging device includes a voltage multiplier connected in series between said electric power source and said accumulator and including an inductor which is formed by a coil forming part of said display means or of another device of the timepiece.

2. A timepiece according to claim 1, wherein said display means includes a motor and wherein said coil forms part of said motor.

3. A timepiece according to claim 1, wherein said charging device includes control means arranged for switching said voltage multiplier on and off as a function of the output voltage ($U_{SC}$) of said photovoltaic cell power source.

4. A timepiece according to claim 3, comprising means for monitoring a state of charge of said accumulator, said monitoring means being connected to said control means, wherein said control means is also arranged for blocking the supply of said display means when the state of charge of said accumulator is less than a first limit state.

5. A timepiece according to claim 4, wherein said control means is also arranged for blocking the supply of said horometric means when the state of charge of said accumulator is less than said first limit state or than a second limit state.

6. A timepiece according to claim 1, wherein said electric power source includes one or more substantially transparent photovoltaic cells extending in front of said display means, on the side on which the latter are visible.

7. A timepiece according to claim 1, wherein said electric power source includes a single photovoltaic cell.

8. A timepiece according to claim 1, wherein said electric power source includes at least two photovoltaic cells connected in series.

9. A timepiece according to claim 3, wherein said control means includes a comparison unit arranged for receiving an analog signal representative of the output voltage ($U_{SC}$) of said electric power source and providing a binary signal ($V_{SC}$) indicating whether said output voltage is more or less than a predetermined threshold.

10. A timepiece according to claim 9, wherein said comparison unit is a static comparator supplied by said accumulator.

11. A timepiece according to claim 10, wherein said static comparator is an inverter or follower CMOS circuit, including at least one pair of complementary p and n type transistors, said static comparator having a switching voltage which is fixed by the geometrical dimensions of said transistors.

12. A timepiece according to claim 9, wherein said control means includes a voltage monitoring circuit, receiving as input the voltage (VDD) across the terminals of said accumulator and supplying an accumulator voltage signal (EOL), and a logic circuit receiving said binary signal ($V_{SC}$) and said accumulator voltage signal (EOL) and supplying at least one control signal (CONV) to switch said voltage multiplier on or off.

13. An electronic apparatus including an electric accumulator, display means being supplied by said accumulator, and a charging device provided with a photovoltaic cell electric power source coupled to said accumulator, wherein said charging device includes a voltage multiplier connected in series between said electric power source and said accumulator and including an inductor which is formed by a coil forming part of said display means or of another device of the apparatus.

14. The apparatus of claim 13, wherein said display means includes a motor and wherein said coil forms part of said motor.

15. The apparatus of claim 13, wherein said charging device includes control means arranged for switching said voltage multiplier on and off as a function of the output voltage of said photovoltaic cell power source.

16. The apparatus of claim 15, comprising means for monitoring a state of charge of said accumulator, said monitoring means being connected to said control means, wherein said control means is also arranged for blocking the supply of said display means when the state of charge of said accumulator is less than a first limit state.

17. The apparatus of claim 16, comprising horometric means being supplied by said accumulator, wherein said control means is also arranged for blocking the supply of said horometric means when the state of charge of said accumulator is less than said first limit state or than a second limit state.

18. The apparatus of claim 13, wherein said electric power source includes one or more substantially transparent photovoltaic cells extending in front of said display means, on the side on which the latter is visible.

19. The apparatus of claim 13, wherein said electric power source includes a single photovoltaic cell.

20. The apparatus of claim 13, wherein said electric power source includes at least two photovoltaic cells connected in series.

21. The apparatus of claim 15, wherein said control means includes a comparison unit arranged for receiving an analog signal representative of the output voltage of said electric power source and providing a binary signal indicating whether said output voltage is more or less than a predetermined threshold.

22. The apparatus of claim 21, wherein said comparison unit is a static comparator supplied by said accumulator.

23. The apparatus of claim 22, wherein said static comparator is an inverter or follower CMOS circuit, including at least one pair of complementary p and n type transistors, said static comparator having a switching voltage which is fixed by the geometrical dimensions of said transistors.

24. The apparatus of claim 21, wherein said control means includes a voltage monitoring circuit, receiving as input the voltage across the terminals of said accumulator and supplying an accumulator voltage signal, and a logic circuit receiving said binary signal and said accumulator voltage signal and supplying at least one control signal to switch said voltage multiplier on or off.

* * * * *